(12) United States Patent
Landau

(10) Patent No.: US 7,049,544 B2
(45) Date of Patent: May 23, 2006

(54) BEAMSPLITTER FOR HIGH-POWER RADIATION

(75) Inventor: Igor Landau, Palo Alto, CA (US)

(73) Assignee: Ultratech, Inc., San Jose, CA (US)

( * ) Notice: Subject to any disclaimer, the term of this patent is extended or adjusted under 35 U.S.C. 154(b) by 0 days.

(21) Appl. No.: 10/810,087

(22) Filed: Mar. 26, 2004

(65) Prior Publication Data

US 2005/0213211 A1   Sep. 29, 2005

(51) Int. Cl.
*B23K 26/06* (2006.01)
*G02B 5/30* (2006.01)

(52) U.S. Cl. .............................. 219/121.73; 359/495

(58) Field of Classification Search ............ 359/495, 359/629, 636, 638; 219/121.73
See application file for complete search history.

(56) References Cited

U.S. PATENT DOCUMENTS

| | | | | |
|---|---|---|---|---|
| 5,020,880 A | * | 6/1991 | Bluege | 359/894 |
| 5,587,831 A | * | 12/1996 | Simon et al. | 359/350 |
| 5,706,135 A | * | 1/1998 | Codella | 359/629 |
| 6,020,992 A | * | 2/2000 | Georgiev et al. | 359/359 |
| 6,300,208 B1 | | 10/2001 | Talwar et al. | 438/308 |
| 6,365,476 B1 | | 4/2002 | Talwar et al. | 438/308 |
| 6,531,681 B1 | | 3/2003 | Markle et al. | 219/121.8 |
| 6,580,561 B1 | * | 6/2003 | Crouch et al. | 359/618 |
| 6,770,844 B1 | * | 8/2004 | Morita | 219/121.77 |
| 2003/0123160 A1 | * | 7/2003 | Zeller | 359/819 |

FOREIGN PATENT DOCUMENTS

| | | | |
|---|---|---|---|
| EP | 718642 A2 | * | 6/1996 |
| JP | 2000-190087 A | * | 7/2000 |

\* cited by examiner

*Primary Examiner*—Geoffrey S. Evans
(74) *Attorney, Agent, or Firm*—Allston L. Jones

(57) ABSTRACT

A beamsplitter apparatus for use with high-power radiation is disclosed. The apparatus includes a thermally conductive frame with a central aperture. The frame holds a window in the central aperture at the window's periphery. The window includes a diamond substrate with an optional coating formed thereon. Because the substrate is diamond and the frame is thermally conductive, the window is less susceptible to thermal effects caused by absorption of the incident radiation by the window. Thus, the original flatness of the widow surfaces is preserved, and variations in its index of refraction will be minimal. The result is that high-power radiation beams reflected from and transmitted by the widow remain substantially undistorted.

22 Claims, 10 Drawing Sheets

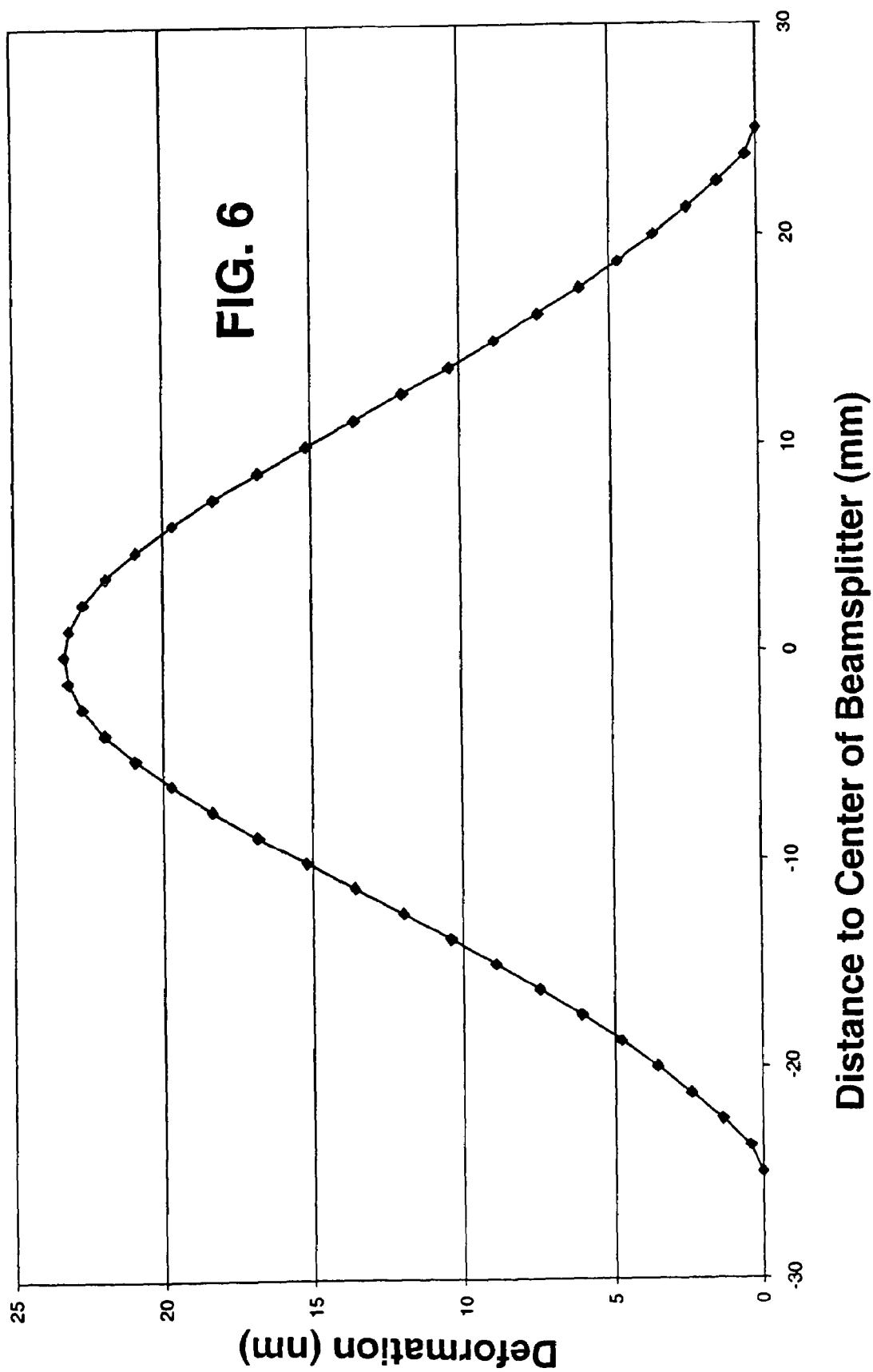

BEAMSPLITTER FOR HIGH-POWER RADIATION

CROSS REFERENCE

This application is related to U.S. patent application Ser. No. 10/287,864 filed Nov. 4, 2002, with that application and the current application being co-owner by the same party.

BACKGROUND OF THE INVENTION

1. Field of the Invention

The present invention relates to components used for splitting and/or combining radiation beams, and in particular to such components suitable for use with high-power radiation beams.

2. Description of the Prior Art

In certain industrial and manufacturing applications involving high-power radiation (e.g., radiation having a power of about 100 W or greater), it is important to maintain beam uniformity or otherwise preserve the integrity of the radiation beam wavefront. For example, in laser thermal annealing or LTA (also referred to as "laser thermal processing" or LTP), high-power laser radiation (e.g., 10.6 µm radiation from a $CO_2$ laser) is used to quickly raise the surface temperature of a workpiece (e.g., substrate such as a semiconductor wafer) to selectively change its properties. The temperature rise is sufficiently fast that the average substrate temperature is not substantially changed, and conduction of heat into the substrate body serves to quench the high surface temperature very quickly. An example LTA application involves annealing and/or activating dopants in the source, drain or gate regions of transistors formed in a substrate in order to form integrated devices or circuits. LTA can also be used to form silicide regions in integrated devices or circuits, to lower poly-silicon runner resistances, or to trigger a chemical reaction to either deposit or remove substances from a substrate (or wafer). Example LTA applications are described in U.S. Pat. Nos. 6,300,208, 6,365,476, and 6,531,681.

In performing LTA, it is important that the radiation beam incident on the workpiece (i.e., substrate or wafer) being annealed be uniform over the area selected for processing, or have a consistent and predictable shape, such as a Gaussian shape. To this end, it is important that any optical system components used to transmit, reflect, split or combine the radiation beam do not alter the beam in a manner that introduces unintended non-uniformities. Such non-uniformities can arise, for instance, when an optical component changes shape or develops an index of refraction variation that distorts the radiation beam wavefront or non-uniformly absorbs radiation over the beam aperture.

Unfortunately, there is a dearth of optical components available for manipulating high-power laser radiation. In particular, there appears to be no commercially available polarizer for polarizing a high-power $CO_2$ laser radiation beam in a manner that leaves the wavefront substantially undistorted, e.g., distorted by less than 150 nm.

One prior art method of making a polarizer involves placing a suitable thin-film coating on one or more zinc selenide windows (substrates). The polarizer is then placed at an oblique angle (e.g., 45°) with respect to the radiation beam incident direction. The coating reflects most of one polarization and transmits most of the orthogonal polarization.

Polarizers are useful for independently attenuating the output power of a $CO_2$ laser radiation beam. The output radiation beam from the laser is typically linearly polarized. The polarization direction is easily rotated by a three-mirror (k-mirror) assembly that rotates about the beam axis leaving the propagation direction undisturbed. By changing the beam polarization direction with respect to a fixed polarizer it is possible to split the beam into two, separated linearly polarized components in which the power can be adjusted over a wide range.

Unfortunately, with prior art beamsplitters (which those skilled in the art understand also act as beam combiners) the absorption of the window material and the associated coating(s) is sufficient to produce appreciable heating resulting in high temperatures near the middle of the window. This, in turn, causes the index of refraction of the window to change, and also causes the surface of the window to distort. The result is that the wavefronts of both the reflected and transmitted radiation beams are distorted. The degree of wavefront distortion varies depending on the intensity of the radiation beam and how long it is incident on the beamsplitter. However, the degree of wavefront distortion is generally unacceptably large for most high-power laser radiation applications requiring a highly uniform, polarized, radiation beam.

Accordingly, what is needed is a beamsplitting component suitable for use with a high-power radiation beam that does not appreciably distort the radiation beam wavefront(s).

SUMMARY OF THE INVENTION

A first aspect of the invention is a beamsplitter apparatus for a high-power radiation beam. The apparatus includes a thermally conductive, cooled frame with a central aperture, and a window held in the central aperture in a manner that facilitates the conduction of heat from the window to the frame. The window includes a diamond substrate and in an example embodiment an optional coating is formed on the surface of the diamond substrate. In some instances, the inherent properties of the diamond substrate are sufficient to perform the beamsplitting and beam combining functions without the use of a coating. The coating may be a beamsplitting coating, or may be a coating designed to reflect and transmit a select amount of the incident high-power radiation beam.

A second aspect of the invention is a method of separating first and second polarization components from a polarized high-power polarized radiation beam. The method includes directing the high-power radiation beam to a polarizing beamsplitter having a thermally conducting frame and a window held in thermal contact within the frame. The window has a coating formed on a surface of a diamond substrate. The method also includes reflecting a portion of the high-power radiation beam from the window to form a first polarized radiation beam having the first polarization component, and transmitting through the window a portion of the high-power radiation beam to form a second radiation beam. The window absorbs a portion of high-power polarized radiation beam as heat. The method further includes removing the heat from the window by transmitting the heat to the frame and cooling the frame so that the temperature of the window remains near that of the coolant. The flat surfaces of the window remain substantially undistorted as a result of the excellent thermal conductivity of diamond. This keeps the wavefront distortion on the reflected (first) radiation beam low. Also, as a result of the excellent thermal conduction on the substrate and the low coefficient of index change with temperature for diamond, both the center-toedge thermal and refractive index gradients are kept small. This keeps the wavefront distortion of the transmitted (second) radiation beam low.

A third aspect of the invention includes further processing the first or second polarized radiation beams with a second beamsplitter similar, or identical, to the first beamsplitter to increase the purity of the polarization in the first or second polarized radiation beam.

BRIEF DESCRIPTION OF THE DRAWINGS

FIG. 6 is a plot, based on computer simulation, of the amount of deformation (in nanometers, m) of the window of the polarizing beamsplitter apparatus constructed as shown in FIG. 1, wherein the deformation (nm) is shown as a function of the distance (mm) to the center of the window, as measured along the Y-direction, based on irradiating the window with a 5 kW $CO_2$ laser radiation beam while also cooling the apparatus with the cooling system;

Figure 1:
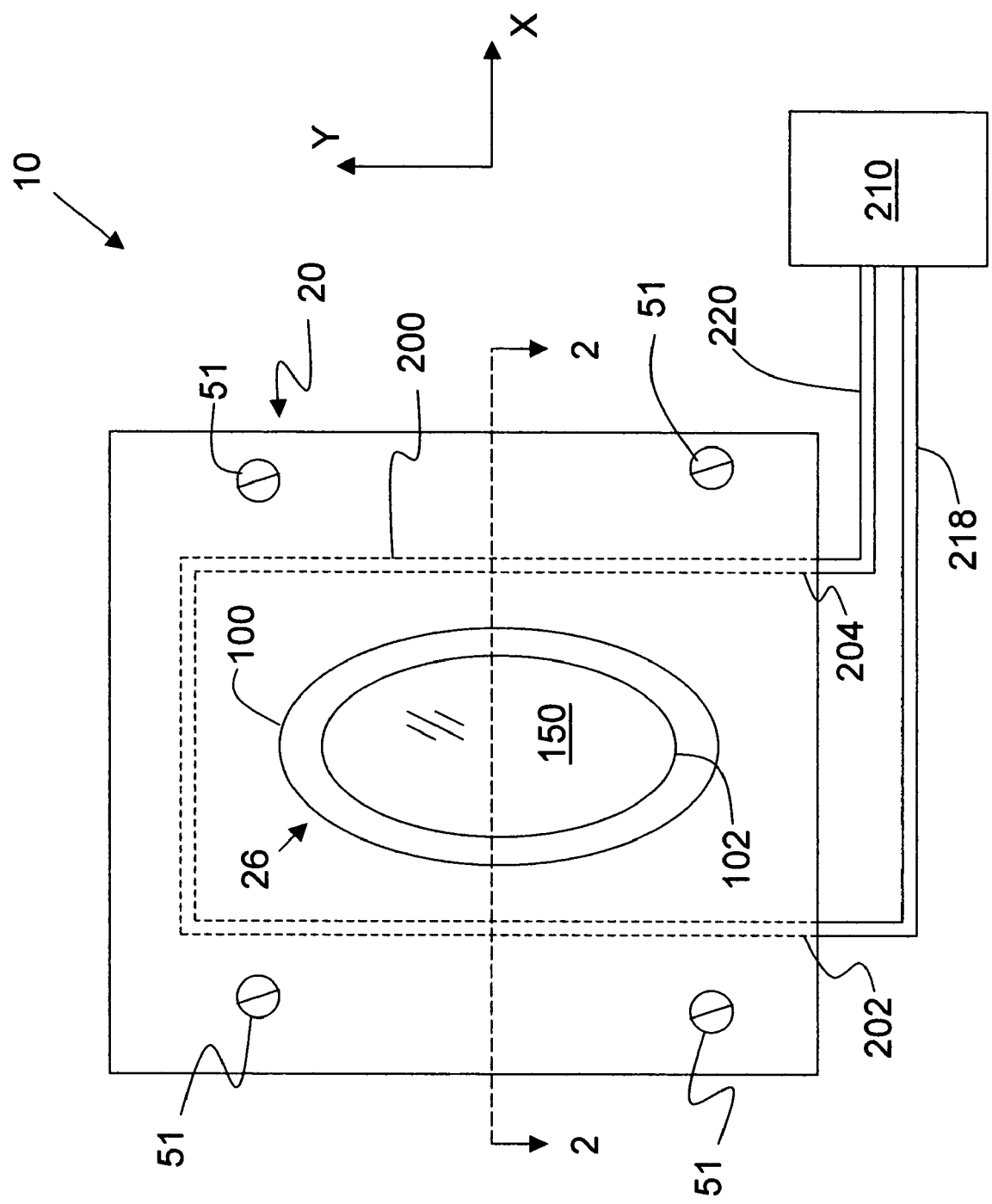
FIG. 1 is a top-down view of an example embodiment of the beamsplitter apparatus according to the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention is directed to a component for splitting apart a high-power radiation beam, and/or combining two or more high power radiation beams, without introducing appreciable wavefront distortion. The same apparatus used for splitting one radiation beam into two beams can also be used to combine two beams into one beam. Thus, the term "beamsplitter" is used herein to describe the apparatus (component) of the present invention that can perform either of these operations (i.e., beamsplitting and beam combining).

In an example embodiment of the present invention, the beamsplitter of the present invention is non-polarizing, i.e., it can receive a single radiation beam and split it into two differently radiation beams, and vice versa. In another example embodiment, the beamsplitter is polarizing, i.e., it can receive a polarized radiation beam and split it into two polarized radiation beams, and vice versa.

Figure 2:
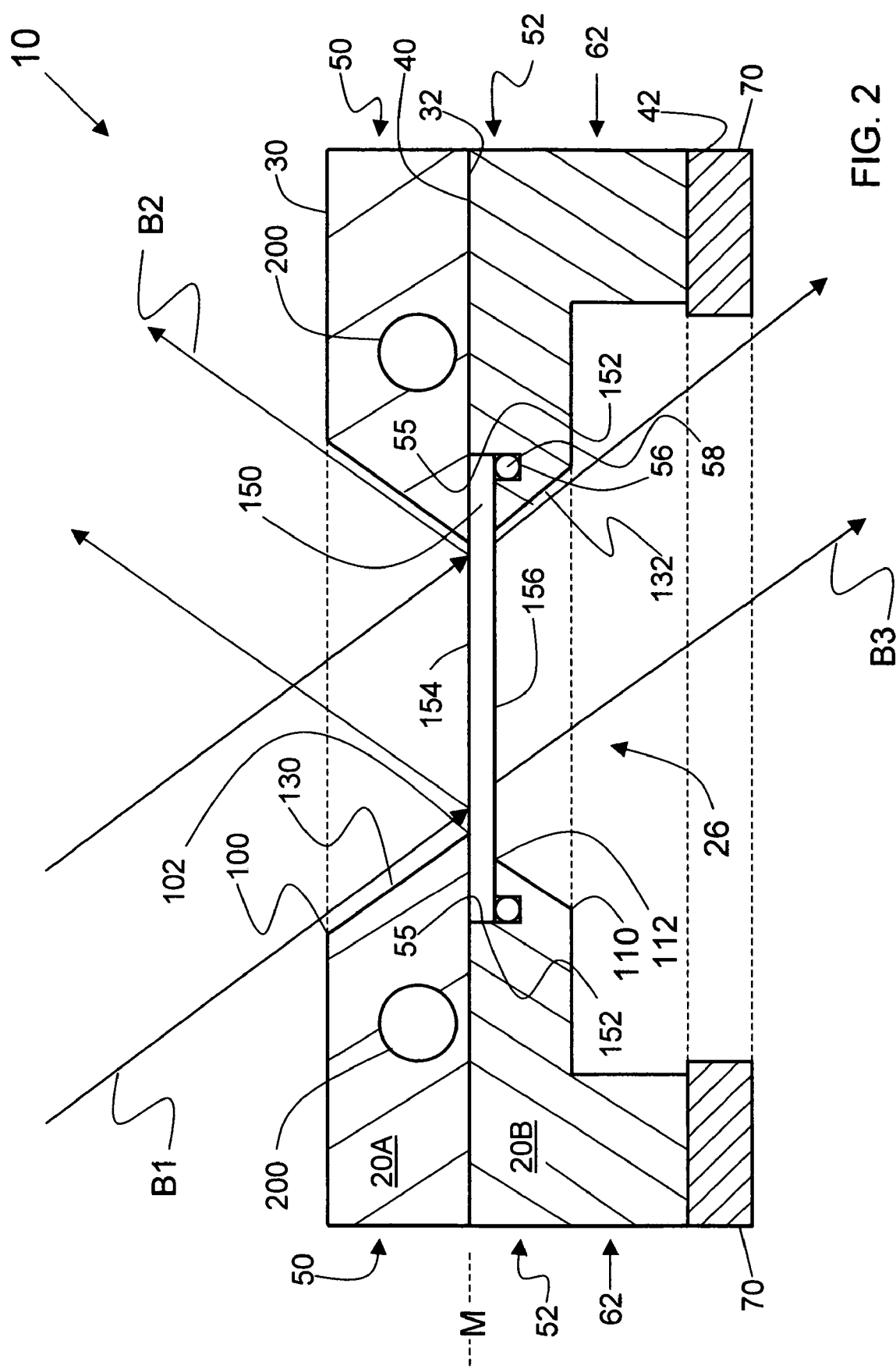
FIG. 2 is a cross-sectional view of the beamsplitter apparatus of FIG. 1 taken along the line 2—2 of FIG. 1, also showing incident, reflected and transmitted high-power radiation beams.
Figure 3:
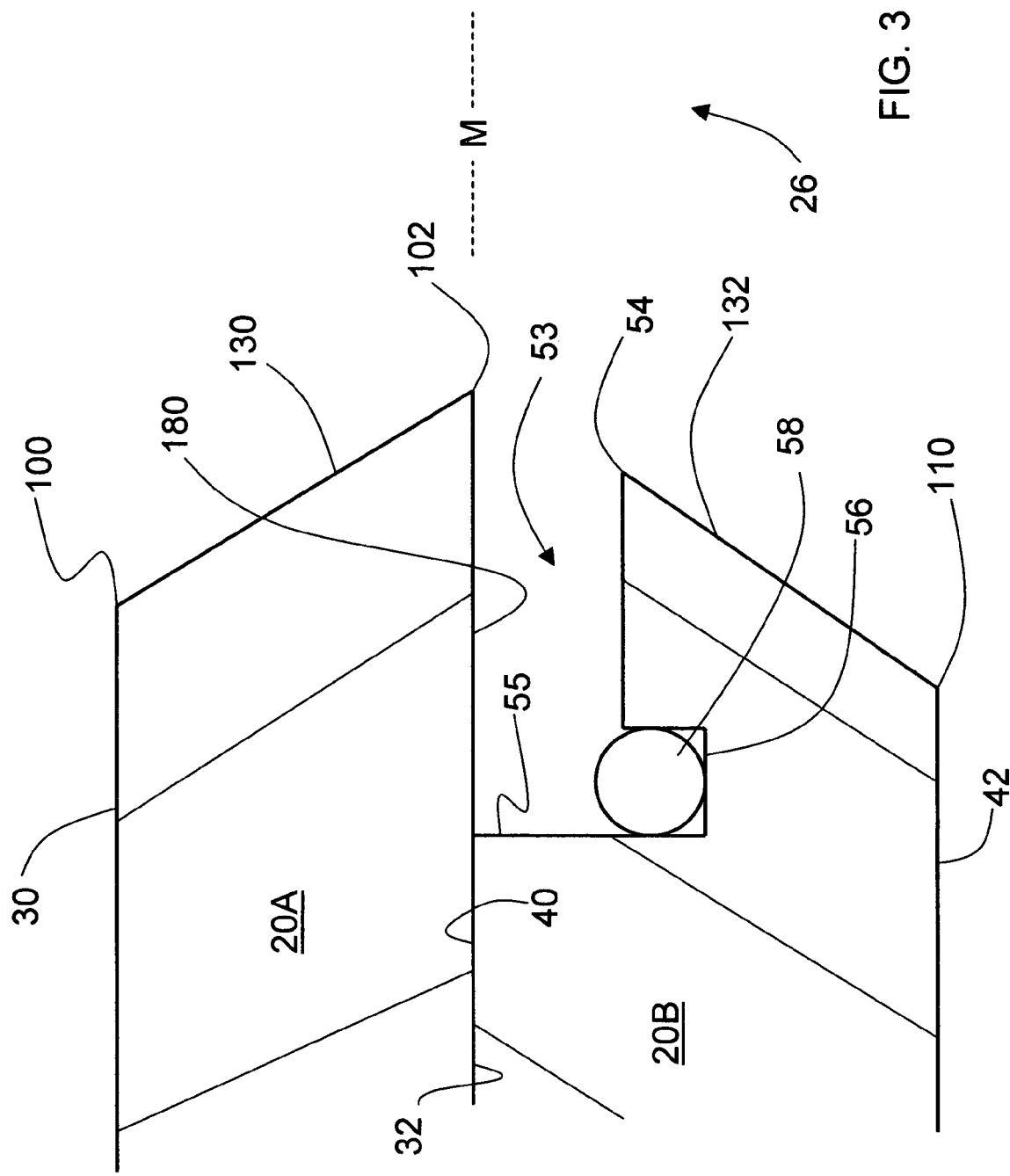
FIG. 3 is a close-up view of a portion of the beamsplitter apparatus of FIG. 2, without the window present in the apparatus.

FIG. 1 is a top-down view of an example embodiment of a beamsplitter apparatus ("beamsplitter") 10 according to the present invention. FIG. 2 is a cross-sectional view of apparatus 10 taken along the line 2—2 in FIG. 1. FIG. 3 is a close-up view of a portion of apparatus 10 of FIG. 2. An incident radiation beam B1 is shown in FIG. 2, along with a reflected radiation beam B2 and a transmitted radiation beam B3. In an example embodiment, incident radiation beam B1 has high-power, e.g., 100 Watts or greater.

With reference to FIGS. 1, 2 and 3, apparatus 10 includes a frame 20 having a central aperture 26. In an example embodiment, frame 20 is made of a rigid, thermally conductive material such as metal (e.g., copper). Also in an example embodiment, frame 20 is formed from two sections 20A and 20B, as shown in FIGS. 2 and 3. For the sake of illustration, the discussion below is based on the two-section embodiment of frame 20. Frame section 20A has an upper surface 30 and a lower surface 32, while frame section 20B has an upper surface 40 and a lower surface 42. Frame section 20A has a perimeter 50, while frame section 20B has perimeter 52. Frame sections 20A and 20B are interfaced at surfaces 32 and 40. In an example embodiment, frame sections 20A and 20B are held together by screws 51 (FIG. 1).

With reference to FIG. 3, in an example embodiment frame section 20B includes a shelf portion 53 that runs around the central aperture. Shelf portion 52 includes a lip or rim 54, a retaining edge 55 and a retaining groove 56 in the shelf adjacent rim 54. Retaining edge 55 and retaining groove 56 run around the shelf so as to surround the central aperture. Retaining groove 56 is sized to accommodate an O-ring 58, the purpose of which is discussed below.

With reference to FIG. 2, in an example embodiment, frame section 20B also includes a downwardly depending base portion 62 formed at or near perimeter 52. In an example embodiment, base portion 62 is fixed to a base plate 70 to facilitate mounting apparatus 10 to another object (not shown), e.g., in order to include apparatus 10 in an optical system, as described in greater detail below. In an example embodiment, base plate 70 is metal, such as stainless steel.

Figure 4:
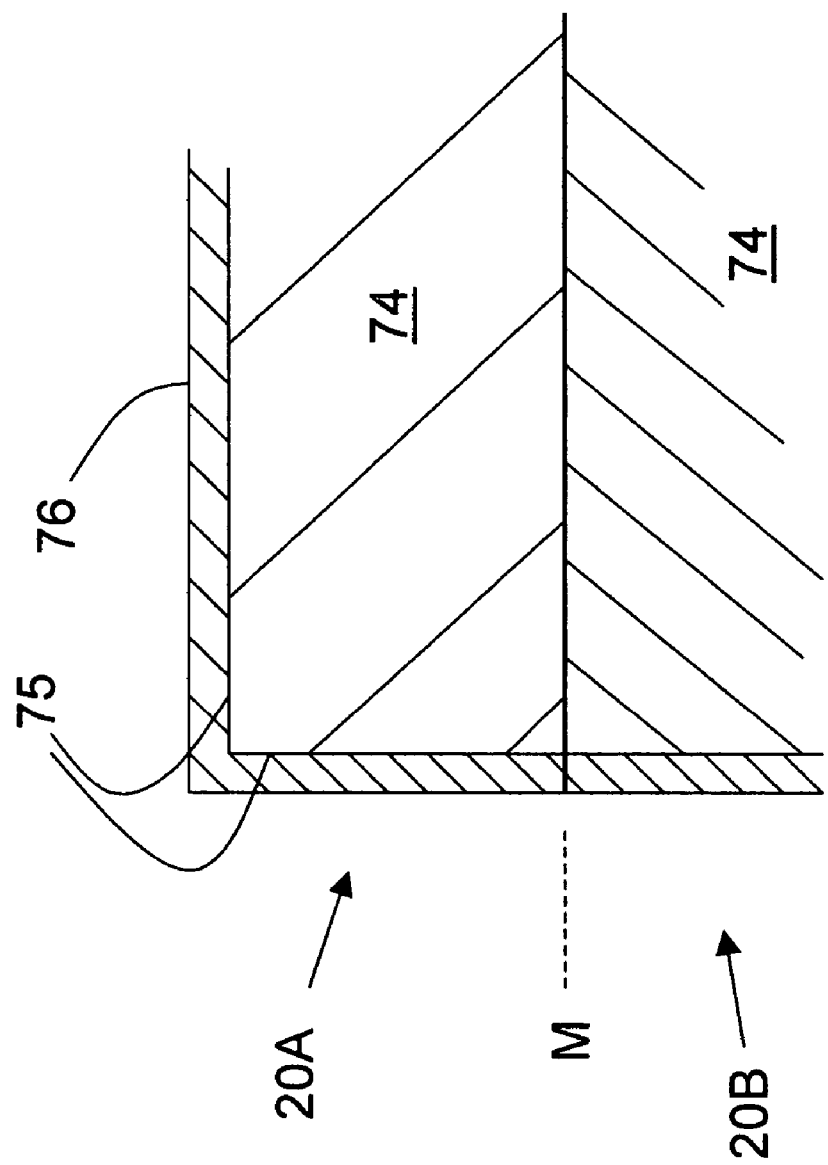
FIG. 4 is a close-up view of a portion of the upper and lower frame sections of the right side of beamsplitter apparatus of FIG. 2, showing an example embodiment wherein the frame is made of copper coated with a gold film layer.

With reference now to FIG. 4, in an example embodiment frame sections 20A and 20B are each constituted by a copper body 74 with an outer surface 75 coated with a thin gold layer 76. Such an arrangement provides thermal conductivity while limiting the potential for contaminating an object such as a semiconductor substrate (not shown) with copper while the object is being processed with one of the high-power radiation beams.

With reference again to FIGS. 1–3, in an example embodiment central aperture 26 within frame 20 is sized to accommodate the cross-sectional shape of radiation beam B1. In an example embodiment, central aperture 26 is elongate (e.g., elliptical or oval), to accommodate a circular radiation beam incident the apparatus at an angle. Central aperture 26 is defined within frame 20 by a first outer rim 100 at upper surface 30, a first inner rim 102 at lower surface 32, a second outer rim 110 at upper surface 40 and a second inner rim 112 at lower surface 42. In a preferred embodiment, central aperture 26 is smaller at inner rim 102 than at outer rim 100, and is smaller at inner rim 112 than at outer rim 110. The first outer and inner rims 100 and 102 are connected by a beveled surface 130, while the second outer and inner rims 110 and 112 are connected by a beveled surface 132. Thus, in a preferred embodiment, central aperture 26 is smaller at or near the middle portion of the frame (as indicated by dashed line M) than at top surface 30 or bottom surface 42 of the frame (FIG. 2).

Figure 5:
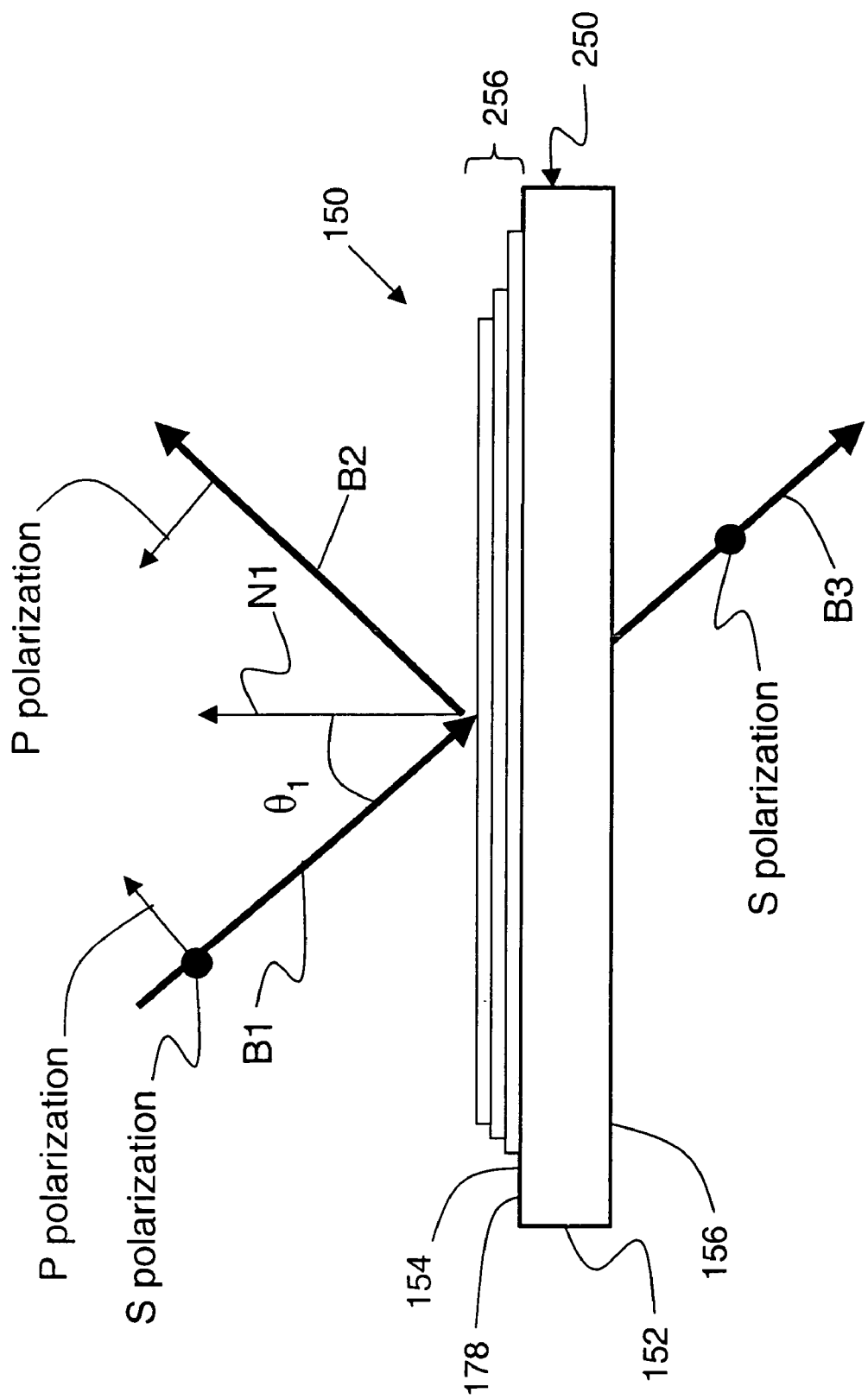
FIG. 5 is a close-up view of the window of a polarizing beamsplitter apparatus, also showing the incident, reflected and transmitted high-power radiation beams.

With reference also to FIG. 5, apparatus 10 further includes a window 150 (not shown in FIG. 3) having a periphery 152, an upper surface 154 and a lower surface 156. Window 150 is supported in central aperture 26 at or near its periphery 152 and at or near the middle M of the frame, with periphery 152 preferably abutting up against retaining edge 55 to facilitate thermal contact between the frame and the window. Thus, frame sections 20A and 20B serve as flanges for window 150. Window 150 is discussed in greater detail below.

With reference again to FIGS. 2, 3 and 5, elastic O-ring 58 resides in retaining groove 56. In an example embodiment, O-ring 58 is made of a particle-free, temperature-resistant, compressible material such as synthetic rubber. When frame sections 20A and 20B are interfaced and secured together to form frame 20, O-ring 58 presses against window surface 156, which causes a portion 178 of window upper surface 154 adjacent periphery 152 to press tightly against a corresponding portion 180 of lower surface 32 of frame section 20A adjacent inner rim 102. The tight fit between window 150 and frame section 20A at respective surface portions 178 and 180 provides good thermal contact between the window and the frame so that any heat absorbed by the window can be efficiently transferred to the frame.

In an example embodiment, to enhance the degree of thermal contact between window 150 and frame 20, lower surface portion 180 of frame section 20A and peripheral window surface portion 178 are made smooth. In an example embodiment, this is done by lapping or diamond turning. In an example embodiment, surface portions 178 and 180 are made to have a smoothness of about 50 nm root-mean-square (RMS) or less.

In an example embodiment (FIGS. 1 and 2), frame 20 includes a cooling channel 200 having an input end 202 and an output end 204. Further in an example embodiment, apparatus 10 includes a cooling system 210 coupled to cooling channel 200 by a first conduit 218 coupled to input end 202 and an second conduit 220 coupled to output end 204. Cooling system 210 operates to flow a cooling fluid (e.g., water) from conduit 218 into input end 202 of cooling channel 200 and to receive cooling fluid flowing from output end 204 via conduit 220. Cooling system 210 is adapted to remove the heat absorbed by the cooling fluid prior to reintroducing the cooling fluid into cooling channel 200. Cooling channel 200 can generally be formed anywhere in frame 20, that allows cooling system 210 to serve its purpose of cooling frame 20. For instance, in example embodiments, cooling channel 200 is formed in base plate 70, in frame section 20B, in frame section 20A (as shown in FIG. 2), or portions of cooling channel 200 are formed both in frame sections 20A and 20B.

Returning now to FIG. 5, window 150 includes a diamond substrate 250 upon which is formed one or more films or coatings 256 that constitute a "beamsplitter coating." In an example embodiment, beamsplitter coating 256 is an anti-reflection coating designed to selectively reflect a portion of an incident radiation beam B1, thereby forming a reflected radiation beam B2 and a transmitted radiation beam B3.

In another example embodiment, coating 256 is designed to receive an incident radiation beam B1 having S and P polarizations and form therefrom a reflected radiation beam B2 having a select polarization (e.g., S polarization), and transmitted radiation beam B3 having the remaining polarization (e.g., P Polarization) for a given wavelength and incident angle of incident radiation beam B1.

In an example embodiment, incident radiation beam B1 is a high-power radiation beam having a power of 100 Watts or greater, a wavelength of 10.6 μm, and an incident angle $\theta_1$ of between 30 degrees and 80 degrees relative to the surface normal N1 of the window.

Diamond substrate 250 is transparent to 10.6 μm radiation and has an unusually high thermal conductivity (2100 W/mK) as well as a small coefficient of expansion of $1.35 \times 10^{-6}$/K and a small coefficient of refractive index change with temperature of $10 \times 10^{-6}$/K. Accordingly, window 150 is not significantly altered by the high-powered radiation and so does not significantly distort the wavefronts of reflected radiation beam B2 and transmitted radiation beam B3.

In an example embodiment, in order to enhance thermal conduction between window 150 and frame 20, window surface peripheral portion 178 is not coated with beamsplitter coating 256. In an example embodiment, this uncoated peripheral portion of the window surface extends inward from window periphery 152 by about 1.5 mm.

FIG. 6 is a plot, based on computer simulation, of the amount of deformation (in nanometers, m) in window 150 as a function of the distance (mm) to the center of the window taken along the Y-direction based on irradiating the window in apparatus 10 with a 5 kW $CO_2$ laser radiation beam B1. Apparatus 10 was simulated as being cooled with a coolant flowed at 2.5 liters/minute with a coolant inlet temperature of 15° C. The maximum deformation of the window corresponds to a negligible 0.0022 waves at the $CO_2$ laser wavelength of 10.6 μm. The same simulation shows a corresponding distribution in window temperature due to absorption, ranging from a minimum temperature of about 52.5° C. at the window periphery to a maximum of about 70° C. at the window center. Because of the low coefficient of refractive index change of the diamond substrate with temperature, the resultant amount of wavefront deformation caused by spatial variations in the refractive index of the window due to variations in the window temperature is negligible.

In an example embodiment, window 150 has a dimension in the X-direction of about 36 mm and a dimension in the Y-direction of about 50 mm. In another example embodiment, window 150 has a thickness in the range from about 0.5 mm to about 2 mm.

Table 1 sets forth an example structure for a polarizing beamsplitter coating 256 on window 150. In the Table 1 example, the diamond substrate is formed by chemical vapor deposition (CVD) and the coating includes multiple film layers.

TABLE 1

Example Window Structure

| LAYER MATERIAL | THICKNESS |
|---|---|
| DIAMOND | [Substrate] |
| ThF$_4$ | 2295.06 nm |
| Ge | 568.58 nm |
| ThF$_4$ | 1517.44 nm |
| ZnSe | 900.73 nm |
| ThF$_4$ | 2015.08 nm |
| ZnSe | 1054.01 nm |
| ThF$_4$ | 2237.88 nm |
| ZnSe | 1140.80 nm |

The design of the beamsplitter coating in Table 1 uses pairs of high-low index materials in optical thicknesses near the ¼ wavelength. The diamond substrate thickness is effectively infinite with respect to the layers making up coating 256. The coating in Table 1 has an S-polarization reflectivity ($R_S$) of greater than 99%, a P-polarization reflectivity ($R_P$) of less than 0.5%, and an extinction ratio of greater than 200:1 for a 10.6 micron laser beam incident at 45°. Other example embodiments of beamsplitter coatings include the use of BaF$_2$ for ThF$_4$ as the low-index material, and substituting ZnSe for Ge to further reduce absorption.

Table 2 sets forth an example structure for a non-polarizing, broad band beamsplitter coating 256 on window 150 operating at a wavelength of 10.6 microns. In the example below, the diamond substrate is formed by chemical vapor deposition (CVD) and the thickness of the coating layers are in nano-meters. The indices of refraction are: Diamond: 2.37, Germanium: 4.0, ZnSe: 2.4028 and ThF4: 1.33.

TABLE 2

Example Window Structure

| LAYER MATERIAL | THICKNESS |
|---|---|
| DIAMOND | [Substrate] |
| ZnSe | 1092.88 |
| ThF$_4$ | 1502.12 |
| Ge | 462.72 |
| ThF$_4$ | 1075.83 |
| Ge | 374.51 |
| ThF$_4$ | 820.76 |
| ZnSe | 429.51 |
| ThF$_4$ | 948.07 |
| ZnSe | 732.52 |

Method of Operation

With reference again to FIG. 5, an example embodiment of the method of operation of apparatus 10 for separating the polarization components of a high-power radiation beam B1 is now described. Radiation beam B1 is incident on the beamsplitter coating 256 on window 150 at an incidence angle $\theta_1$. In the example embodiment, radiation beam B1 includes both P and S polarizations. A portion of radiation beam B1 is reflected to form reflected radiation beam B2 that includes only (or substantially only) a select polarization, e.g., S-polarization. Likewise, the remaining portion of radiation beam B1 passes through window 150 and includes only (or substantially only) the other polarization, e.g., P-polarization.

While radiation beam B1 is incident on window 150 of apparatus 10, heat absorbed by window 150 is transferred to frame 20 due to the close contact ("thermal contact") between window surface periphery portion 178 and lower surface portion 180 of frame section 20A (FIG. 3). To prevent frame 20 and window 150 from overheating and possibly deforming the window (and thus deforming the wavefronts of reflected and transmitted radiation beams B1 and B2), cooling system 210 of FIG. 1 is activated to flow coolant through frame 20 while the window is being irradiated. Here, "deforming the window" includes both surface flatness deformation and inducing non-uniform refractive index changes in the window.

As discussed above in connection with FIG. 1, cooling system 210 flows a coolant fluid (e.g., water or glycerin) from conduit 218 into input end 202 of cooling channel 200 and receives the returned cooling fluid flowing from output end 204 via conduit 220. Cooling system 210 also acts to remove the heat absorbed by the cooling fluid prior to reintroducing the cooling fluid into cooling channel 200. In example embodiments, computer simulations or empirical studies are used to establish the necessary amount of coolant flow through frame 20 to ensure that window 150 remains substantially undistorted, e.g., the transmitted and reflected wavefront distortions remain below an acceptable distortion threshold value. One example of a maximum acceptable wavefront distortion value is ¼ wave, while another is ¹⁄₁₀ wave, assuming a 10.6 micron wavelength.

The method of the present invention for splitting a beam B1 or combining beams B2 and B3 without treating the polarization components differently is similar to that described above, except that coating 256 is designed to treat both polarization components similarly. Thus, beam B1 is split into a reflected beam B2 and a transmitted beam B3, wherein beams B2 and B3 have substantially the same polarization (e.g., random polarization).

Apparatuses in Series

As is common with polarizing beamsplitter devices, the polarization beamsplitter embodiment of beamsplitter 10 generally will not provide absolutely "pure" separation of the P and S polarization components. As an example, the polarization efficiency for polarizing beamsplitter 10 might be 99%. In applications where greater polarization purity is required, in an example embodiment, two or more apparatuses 10 can be used in series to further enhance or "purify" the polarization content of either the reflected radiation beam B2 or the transmitted radiation beam B3.

Figure 7A:
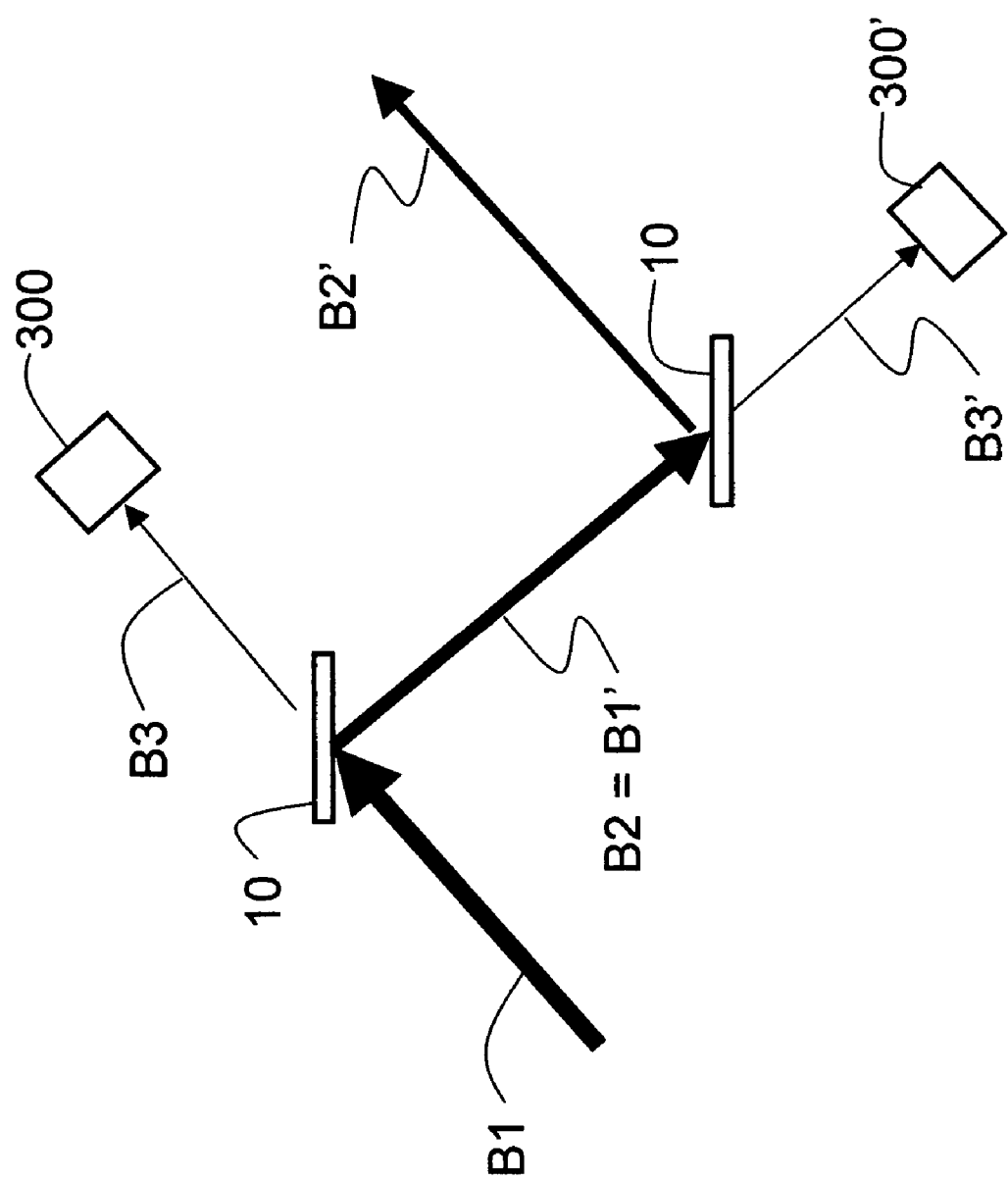
FIG. 7A is a schematic diagram of an example embodiment of two or more polarizing apparatuses arranged in series to enhance the S-polarization/P-polarization ratio of the high-power radiation beam.

With reference to FIG. 7A, in an example embodiment radiation beam Bi is split into reflected radiation beam B2 and transmitted radiation beam B3 by a first apparatus 10. A first radiation beam absorber 300 is optionally arranged to absorb radiation beam B3. Reflected radiation beam B2 then serves as a new incident radiation beam B1', which is made incident onto a second apparatus 10. A second apparatus 10 substantially identical to first apparatus 10 splits beam B1' into a reflected radiation beam B2' and a transmitted radiation beam B3'. A second radiation absorber 300' is optionally arranged to absorb transmitted radiation beam B3'. The result is that doubly reflected beam B2' is polarized with a purity that can approach 9999 parts in 10,000.

Figure 7B:
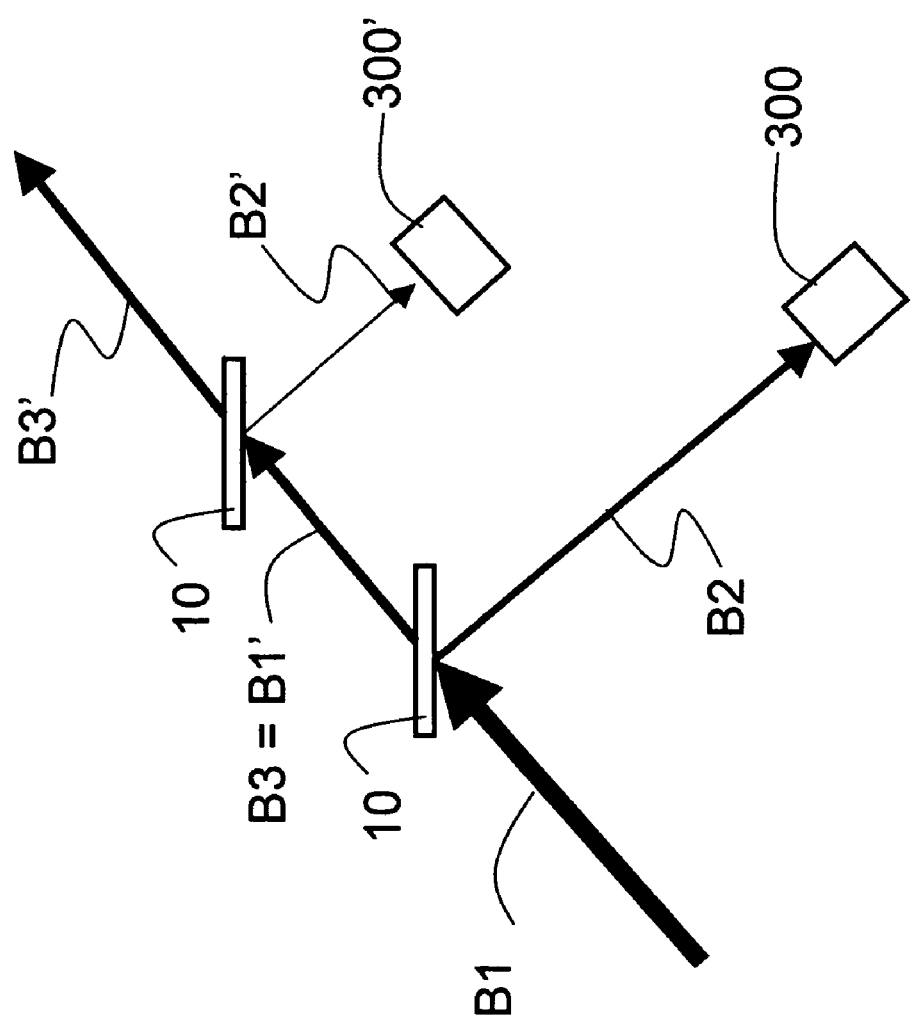
FIG. 7B is a schematic diagram of an example embodiment of two or more polarizing beamsplitters arranged in series to enhance the P-polarization/S-polarization ratio of the high-power radiation beam.

Similarly, in another example embodiment illustrated in FIG. 7B, substantially identical apparatuses 10 are arranged in series to enhance the P polarization purity of radiation beam B3.

Optical System

Figure 8A:
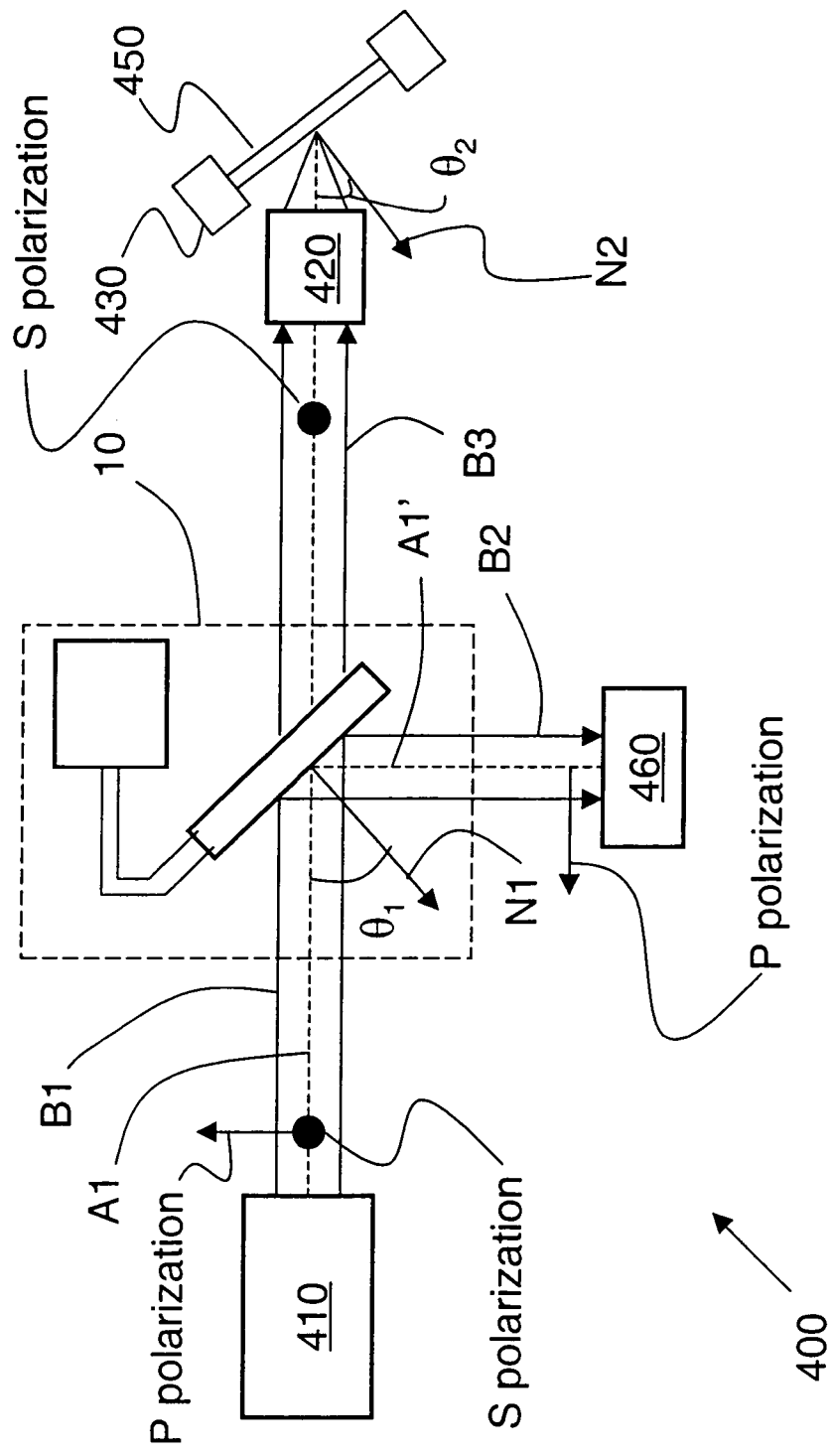
FIG. 8A is a schematic diagram of a first example embodiment of an optical system that includes the polarizing beamsplitter apparatus of the present invention.

FIG. 8A is a schematic diagram of a first example embodiment of an optical system 400 that includes the polarizing embodiment of beamsplitter 10. Optical system 400 includes a high-power laser source 410 capable of emitting high-power laser radiation beam B1 along an optical axis A1. Apparatus 10 is arranged along axis A1 downstream of laser source 410 so that surface normal N1 forms an (incident angle) $\theta_1$ with the optical axis, wherein $\theta_1$ represents an optimal orientation for apparatus 10 to receive radiation beam B1.

Optical system 400 further includes a lens 420 arranged along optical axis A1 downstream of apparatus 10. Lens 420 is adapted to receive and transmit high-power laser radiation. A workpiece holder 430 is located downstream of lens 420 along axis A1. Workpiece holder 430 is capable of holding or otherwise supporting a workpiece 450 to be treated with high-power laser radiation. In an example embodiment, workpiece 450 is a semiconductor wafer.

In an example embodiment, optical system 400 also includes a "beam dump" 460 arranged along a folded optical axis A1'. Beam dump 460 is arranged to intercept the reflected portion of radiation beam B2 so that this radiation beam is not incident upon the substrate 450 or any other parts of the optical system. In an example embodiment, beam dump 460 is an absorbing element, such as a conical beam collector.

In operation of an example embodiment, laser source 410 emits high-power radiation beam B1 having S polarization and P polarization components. Radiation beam B1 is incident on window 150 (FIGS. 1, 2) of apparatus 10 at incident angle $\theta_1$. The S polarization portion of radiation beam B1 is reflected from window 150, forming an S polarized (or substantially S polarized) radiation beam B2. The P polarization portion of radiation beam B1 is transmitted through window 150, forming a P polarized (or substantially P polarized) radiation beam B3. In the example optical system 400 of FIG. 8, the polarized radiation beam B2 is directed along folded optical axis A1' to beam dump 460, where it is absorbed. On the other hand, lens 420 receives the P polarized radiation beam B3 and directs (e.g., focuses) this beam onto workpiece 450.

In an example embodiment relating to laser thermal annealing (LTA), radiation beam B3 is incident workpiece 450 at an incident angle $\theta_2$ with respect to the workpiece surface normal N2. The high-power and select P polarization of radiation beam B3 allows for substrate 450 to be laser thermal annealed in an optimum way. U.S. patent application Ser. No. 10/287,864 discloses performing LTA wherein the annealing radiation beam is P polarized and is incident the workpiece at an incident angle (here, $\theta_2$) at or near the Brewster's angle. This is a preferred geometry for LTA because the film stacks likely to be encountered on a workpiece to be annealed (e.g., a semiconductor wafer), as well as the substrate itself, have a low reflectivity and a small variation in reflectivity at the substrate Brewster's angle.

Figure 8B:
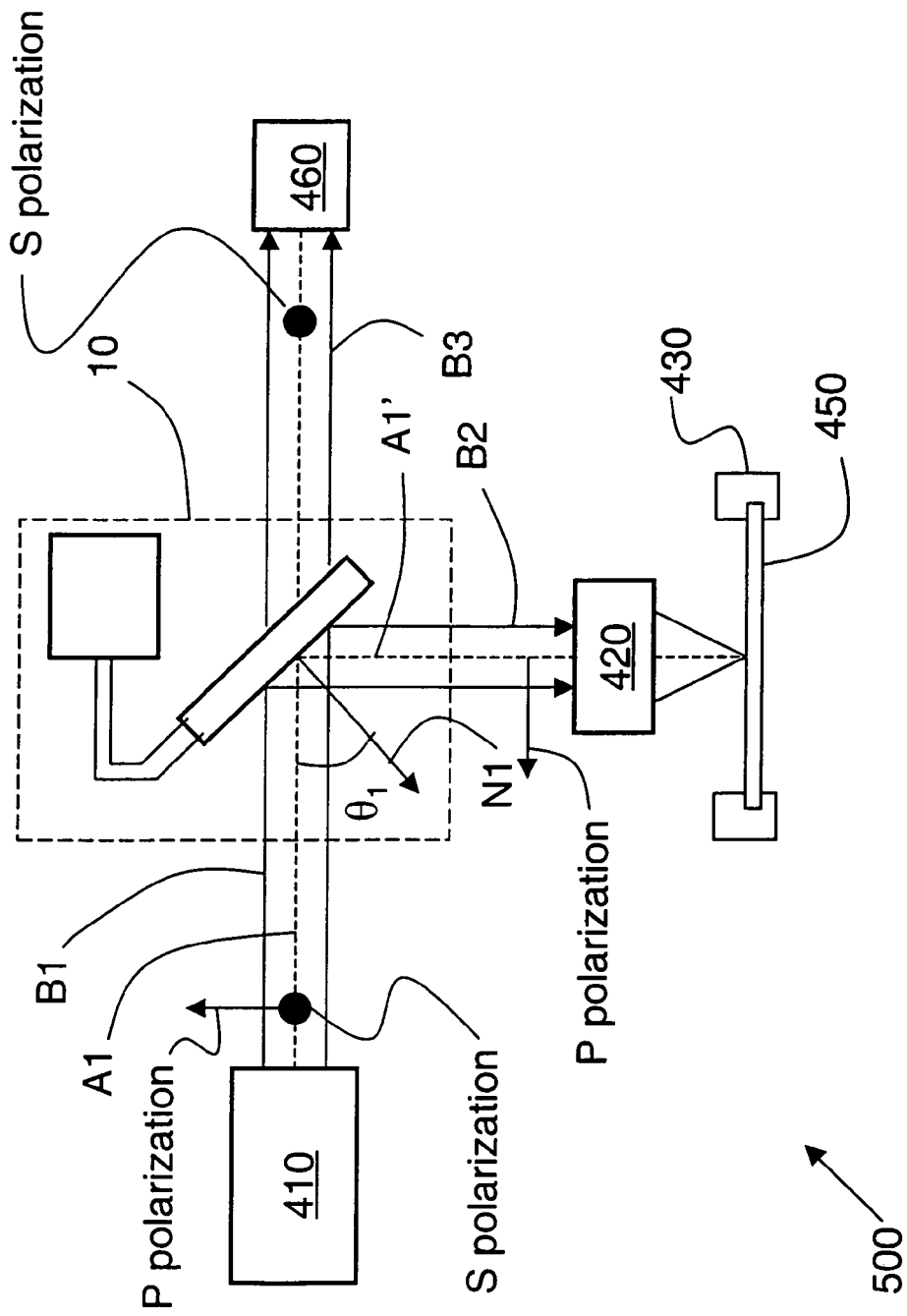
FIG. 8B is a schematic diagram of a second example embodiment of an optical system that includes the polarizing embodiment of the beamsplitter apparatus of the present invention.

FIG. 8B is a schematic diagram of a second example embodiment of an optical system 500 that includes the polarizing embodiment of beamsplitter apparatus 10. Optical system 500 of FIG. 8B includes the same elements as system 400 of FIG. 8A, except that lens 420, workpiece holder 430 and workpiece 450 are arranged along reflected optical axis A1' downstream of apparatus 10, while beam dump 460 is arranged along optical axis A1 downstream of apparatus 10. In system 500, radiation beam B2 is received by lens 420, which directs (e.g., focuses) the high-power radiation onto substrate 450.

Optical system 400 also works in a similar manner when beamsplitter 10 is not polarizing. In this case, window 150 reflects a portion of the incident radiation beam to form radiation beam B2 and transmits a portion to form radiation beam B3. Window 150 also absorbs a portion of the incident radiation beam B1 as heat. This heat is transmitted to the cooled frame so that the temperature of the window is maintained at a level that prevents the window from distorting. (e.g., at the temperature at or near that of the coolant flowed through the frame).

In the foregoing Detailed Description, various features are grouped together in various example embodiments for ease of understanding. The many features and advantages of the present invention are apparent from the detailed specification, and thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A beamsplitter apparatus for use with a high-power power radiation beam, comprising:
    a thermally conducting frame with an elongated central aperture; and
    a window held in the central aperture so as to be able to conduct heat from the window to the frame, wherein the window includes a diamond substrate.

2. The beamsplitter apparatus of claim 1, wherein the window includes a coating formed on the diamond substrate.

3. The beamsplitter apparatus of claim 2, wherein the coating is adapted to reflect a select portion of the high-power radiation beam.

4. The beamsplitter apparatus of claim 1, wherein the frame includes a cooling conduit formed therein, and the apparatus further includes a cooling system operably coupled to the cooling conduit to flow a cooling fluid through the cooling conduit.

5. The beamsplitter apparatus of claim 1, wherein the frame is attached to a base plate.

6. The beamsplitter apparatus of claim 1, wherein the high-power radiation beam has first and second polarization components, and wherein the window includes a coating adapted to reflect the first polarization component and transmit the second polarization component.

7. The beamsplitter apparatus of claim 1, wherein the frame includes:
    a retaining groove that runs around the central aperture;
    an O-ring retained in the retaining grove; and
    wherein the window includes a periphery, and wherein the retaining groove and O-ring operate to press the window to the frame at or near the window periphery.

8. The beamsplitter apparatus of claim 1, wherein the frame is made of copper.

9. The beamsplitter apparatus of claim 8, wherein the copper frame is coated with a layer of gold.

10. The beamsplitter apparatus of claim 1, wherein the frame comprises first and second frame sections.

11. An optical system for irradiating a first substrate with high-power polarized radiation, comprising:
    a radiation source adapted to emit a high-power radiation beam along an optical axis;
    a polarizing beamsplitter apparatus arranged downstream of the radiation source along the optical axis and oriented to receive the high-power radiation beam at a Brewster's angle for the beamsplitter, and form therefrom a reflected high-power radiation beam with a select polarization, the polarizing beamsplitter apparatus comprising:

a thermally conducting frame with an elongate central aperture;

a window held in the central aperture so as to be able to conduct heat from the window to the frame; and wherein the window comprises a diamond substrate and a beamsplitting film formed on the diamond substrate; and a lens arranged to receive the reflected high-power radiation beam and direct it to the first substrate.

12. A beamsplitter apparatus, comprising:

a thermally conducting frame having an elongated central aperture;

a window flat surface and a periphery, and comprising a diamond substrate;

a coating formed on the flat surface; and wherein the window is held by the frame in the elongated central aperture at or near the window periphery such that heat absorbed by the window from a high-power radiation beam incident thereon is conducted to the frame to prevent the flat window surface from substantially distorting.

13. The beamsplitter apparatus of claim 12, wherein the coating includes one or more films made of a material selected from the group materials comprising: $ThF_4$, Ge, ZnSe, and $BaF_2$.

14. The beamsplitter apparatus of claim 12, wherein the frame includes a cooling conduit adapted to flow a cooling fluid therethrough to cool the frame.

15. A method of separating first and second polarization components from a high-power polarized radiation beam, comprising:

directing the high-power radiation beam to a first polarizing beamsplitter at a Brewster's angle, the first polarizing beamsplitter comprising a thermally conducting frame with an elongated central aperture and a first window held in thermal contact within the central aperture of the frame, the first window including a first coating formed on a diamond substrate;

reflecting the first polarization component from the first window to form a first polarized radiation beam, and transmitting the second polarization component through the first window to form a second radiation beam, while the first window absorbs a portion of high-power radiation beam as heat; and removing the heat from the first window by transmitting the heat to the frame and cooling the frame so that the first window remains substantially undistorted.

16. The method of claim 15, further including directing one of the first and second polarized radiation beams to a second polarizing beamsplitter to enhance the polarization of said one polarized radiation beam.

17. A method comprising:

directing an incident radiation beam to a window held in thermal contact within an elongated central amerture of a frame, the window including a diamond substrate, the incident radiation beam being incident to the window at a Brewster's angle for the window;

reflecting a portion of the inddent radiation beam from the window to form a first radiation beam;

transmitting a portion of the incident radiation beam through the window to form a second radiation beam, while the first window absorbs a portion of the incident radiation beam as heat; and removing the heat from the window by transmitting the heat to the frame and cooling the frame so that the first window remains substantially undistorted.

18. The method of claim 17, induding providing a coating to the window, wherein the coating acts to provide a select amount of reflection and transmission of the incident radiation beam.

19. The method of claim 18, wherein the coating is formed as a polarizing coating.

20. An optical system for irradiating workpiece, comprising:

a radiation source adapted to emit a high-power radiation beam;

a beamsplitter apparatus arranged to receive the high-power radiation beam and form therefrom a transmitted high-power radiation beam, wherein the beamsplitter apparatus includes:

a thermally conducting frame with an elongate central aperture;

a window held in the elongate central aperture so as to be in thermal contact with the frame, wherein the window comprises a diamond substrate; and a lens arranged to receive one of the transmitted radiation beam and reflected radiation beam and direct it to the workpiece.

21. The system of claim 20, wherein the high-power radiation beam includes first and second polarization components, and wherein the window includes a beamsplitting coating on the diamond substrate so that the reflected radiation beam includes mostly the first polarization component, and the transmitted radiation beam includes mostly the second polarization component.

22. The system of claim 20, wherein the transmitted radiation is P polarized, and wherein the lens directs the transmitted radiation to the workpiece at an incident angle at or near the Brewster's angle.

* * * * *